July 19, 1949.                H. G. HERSH                2,476,492
                                HEATER
                         Filed Dec. 4, 1944

INVENTOR.
Harry G. Hersh,
BY Morsell & Morsell
ATTORNEYS.

Patented July 19, 1949

2,476,492

UNITED STATES PATENT OFFICE 2,476,492

HEATER

Harry G. Hersh, Milwaukee, Wis.

Application December 4, 1944, Serial No. 566,582

2 Claims. (Cl. 219—34)

This invention relates to improvements in heaters, and more particularly to an electric, radiant, convection heater.

A general object of the invention is to provide an electric heater having an electric resistance or heating unit mounted in a casing in interposed relation to a reflector and heat absorbing metal fins, whereby the radiant heat generated by the heating element is absorbed by the fins which then become convectors causing the heater to function both as a radiant and as a convection heater.

The purchasing public prefers electric heaters wherein the electric coils or heating units become red or glow. This has a psychological effect, and it is, therefore, a further object of the invention to provide an improved and efficient type of electric, radiant, convection heater wherein the visual effect of glowing heating units is preserved.

With respect to electric heaters there is also currently a trend toward fan-equipped heaters so that there is a forced circulation of heated air outwardly of the heating devices. In many fan-equipped electric heaters now on the market the blowing of air directly on the heating elements prevents the same from glowing or becoming red with the result that said heaters, in operation, do not possess the psychological or eye appeal mentioned above. With the foregoing in mind it is, therefore, a further object of the invention to provide an electric heater embodiment having a fan, but with the latter arranged in relation to other structural features of the heater in a manner so that the fan is shielded against blowing air directly on the electric heating elements, whereby glowing of the elements is not deterred, but with the arrangement obtaining the benefits of forced circulation and providing for the efficient outward emission of heat.

A further object of the invention is to provide an electric heater wherein the heat emitting face is covered with spaced heat absorbing metal fins arranged to efficiently absorb heat from the resistance units of the heater and to direct the flow of heated air from the heater through a relatively wide angle.

A further object of the invention is to provide an electric heater which can withstand a relatively high electrical input without undue heating of the casing and associated parts.

A further object of the invention is to provide an electric radiant convection heater which is of very simple construction, is strong and durable, is efficient in operation, is relatively inexpensive to manufacture and operate, which is safe, which is light and portable, and which is well adapted for the purposes described.

With the above and other objects in view, the invention consists of the improved electric heater, and its parts and combinations, as set forth in the claims and all equivalents thereof.

In the accompanying drawing in which the same reference characters indicate the same parts in all of the views.

Figure 1:
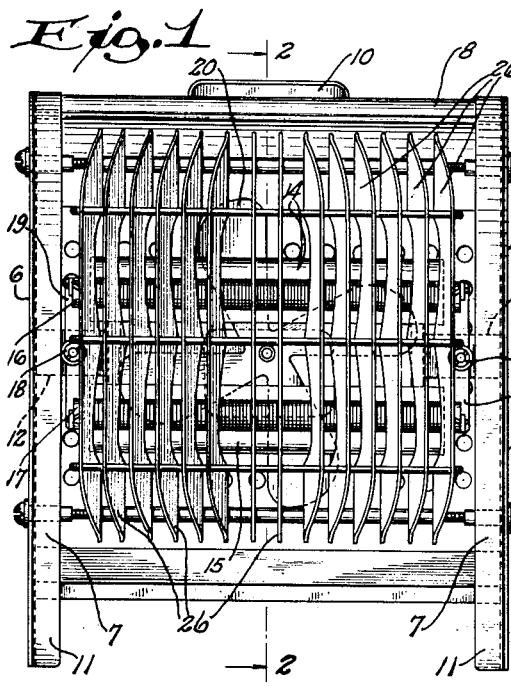
Fig. 1 is a front view of the improved electric heater.

Referring now more particularly to the drawing, it will appear that the electric heater mechanism is embodied in a casing, preferably formed of metal or any other suitable material, designated generally by the numeral 5, and which may assume any desired or convenient shape. In the embodiment illustrated, the casing has imperforate end walls 6 carried by spaced angled frame members 7 of inverted U form. A curved sheet 8, which has its end portions secured to the angled frame members 7, forms the rear and top of the casing and at its lower edge said sheet is bent horizontally forwardly to form the bottom 9 of the casing. In the form of the invention shown in Figs. 1 to 3 inclusive, wherein a fan is included for forced circulation, it is preferable that the rear wall 8 and the bottom wall 9 be provided with series of air admitting openings, as shown. In the form of the invention shown in Fig. 4, said corresponding walls 8' and 9' may be imperforate or portions of one or more of the same may be apertured, depending on special circumstances. The front of the casing, save for fins or heating surfaces later to be described, is open. For convenience in lifting and carrying the heater, a handle 10 may be mounted on a top exterior wall portion of the casing. The lower extremities of the angled frame members 7 are extended below the bottom wall 8 to form supporting feet 11 and to elevate the casing proper above the floor or surface on which it is stationed.

Figure 2:
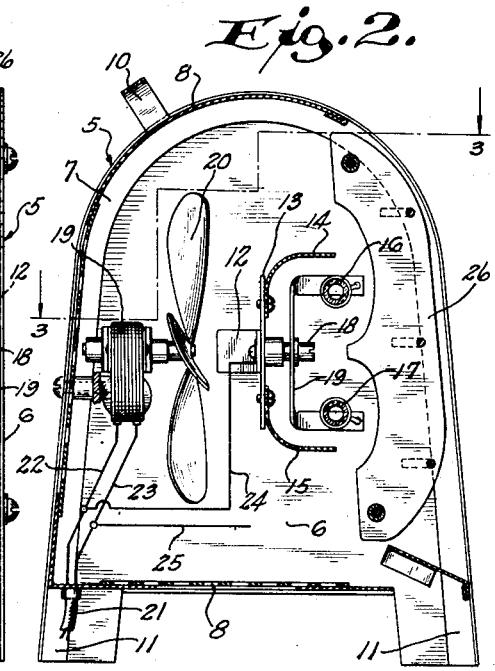
Fig. 2 is a vertical sectional view taken on line 2—2 of Fig. 1.
Figure 3:
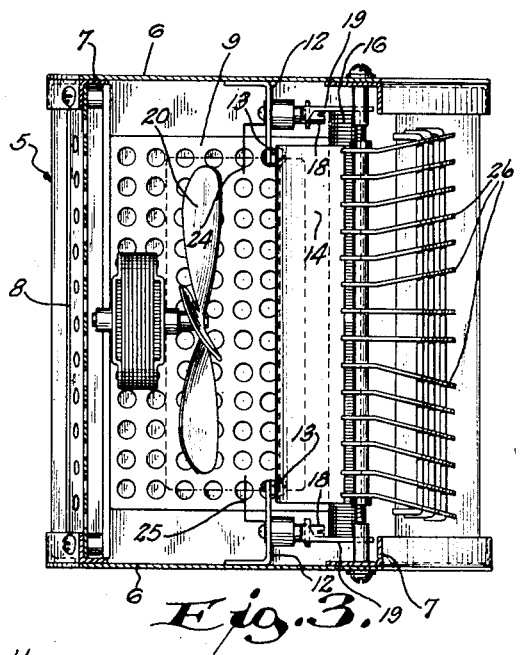
Fig. 3 is a horizontal sectional view taken on line 3—3 of Fig. 2.

With reference to the form of the invention shown in Figs. 1 to 3 inclusive, it will be observed that on an intermediate inner surface portion of each end wall 6 there is mounted a bracket 12, the bracket on one end wall being alined with the corresponding bracket on the other end wall. Each bracket additionally carries a vertical plate 13, and extended longitudinally between the separated plates 13 and having their ends anchored thereto are a pair of spaced, curved or angled reflectors 14 and 15. The top reflector 14 is arranged and disposed so as to shield the top and rear portions of an upper heating element 16, while the lower reflector 15 is arranged so as to shield the rear and lower portions of a lower heating element 17. The reflectors are formed of any suitable material with their front effective surface being highly polished so as to forwardly reflect rays striking the same. As the brackets 12 and 13 are mounted compactly adjacent the end walls of the unit, there is in fact a longitudinal space or opening of substantial width between the reflectors, but the reflectors 14 and 15 effectively shield their respective heating elements 16 and 17 from the effect of forced drafts and prevent air currents blowing directly thereon, as will hereinafter appear.

The end brackets 12 additionally spacedly carry, by means of forwardly projecting studs 18 U-shaped brackets 19 whose upper and lower horizontal arms have anchored thereon the end portions of said electric heating elements or resistance coils 16 and 17, previously mentioned. Said resistance coils are elongated and extend in spaced parallel relation along the longitudinal dimension of the interior of the casing. The heating elements or coils are of the type which are conventional in electrical devices of the type under consideration.

Mounted substantially centrally on the inner surface of the rear wall 8 of the casing is an electric fan 19. The electric fan is disposed so that its blades 20 will blow currents of air through the longitudinal slot between the reflectors 14 and 15 and also above the top and below the bottom of the reflectors so that there will be a thorough diffusion of air into the zone influenced by the electric heating elements 16 and 17, but the reflectors 14 and 15 prevent the cool air from being blown directly onto said heating elements. By this arrangement the forced air is heated and the desirable feature of the glowing of the electric heating units is undisturbed. The electric fan serves to draw cool air into the casing through the perforated rear and bottom walls thereof.

The connections or electrical system for the heater are conventional, and a two-wire cable 21 whose outer extremity may carry a conventional plug (not shown) for connection with a source of electrical energy, enters a convenient protected portion of the casing.

The circuit wires 22 and 23, enclosed by the cable, are extended to suitable terminals on the motor portion of the electric fan. Also, extensions 24 and 25 are tapped off of the circuit wires 22 and 23 respectively, and said wires are connected with extremities of the electric heating units or coils 16 and 17, which are in series.

Across the open front of the casing 5 there are mounted on suitable supporting rods, a plurality of spaced fins or louvers 26, the shape of a fin being best shown in Fig. 2. Said fins are relatively thin and are formed of metal so as to present heat absorbing surfaces. The two medial or central fins may be parallel to one another with their surfaces parallel to the transverse plane of the casing, while the series of fins on opposite sides thereof are preferably angled outwardly. This arrangement and disposition of the fins causes the same to better absorb heat from the heating elements and to also direct the flow of heated air outwardly of the casing through a relatively wide angle or range.

In the operation of the improved heater, when the cable 21 is connected with a source of electrical energy, the heating elements 16 and 17 will be energized and the fan 19 will be set into operation. The latter will draw cool air into the casing and will blow the same forwardly. As previously expained, the reflectors 14 and 15 will prevent the air from being blown directly onto the heating elements and thus the heating elements will not be prevented from maintaining their desirable glow. The reflectors are, however, arranged so that there is a substantial longitudinal slot therebetween through which some of the forced air passes into the zone which is influenced by the heating elements. The efficiency of the heating elements is enhanced by the reflectors and the fins 26 will absorb the radiant heat from the heating elements. At the same time, air blown by the fan passes through the zone influenced by the heating elements and scrubs the surface of the fins and is thereby converted into convection heat for room heating purposes. The heater has a wide range of effectiveness because the arrangement and disposition of the fins diffuses the heated air and directs it outwardly through a broad angle. The fan, in addition to providing for forced circulation, prevents undue heating of the casing and associated parts and permits the unit to withstand a relatively high electrical input.

Figure 4:
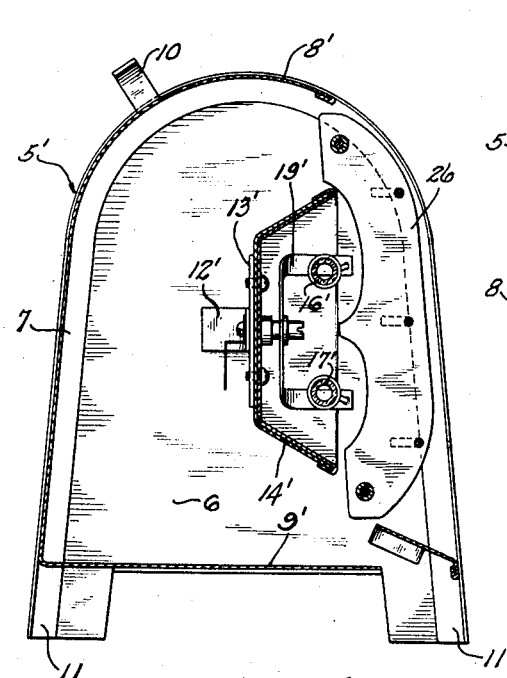
Fig. 4 is a vertical sectional view through an electric heater of a modified or alternative form.

In the modified form of electric heater, disclosed in Fig. 4, the casing 5' is generally of the form disclosed in the principal embodiment of the invention, but perforations in either or both of the walls 8' and 9' may be dispensed with. The alternative form of heater does not employ a fan for forced circulation. The interior of the casing does have mounted therein, on brackets 12' and 13' a pan-shaped reflector 14' whose interior surface forms a reflector for the heating elements 16' and 17' whose end portions are mounted on a bracket 19', as in the principal form of the invention. The modification also has mounted, with respect to the front opening, spaced heat absorbing metal fins or louvers 26. In the modified form of the invention there are, therefore, electric heating elements interposed between a rear reflector and forward fins, whereby the radiant heat generated by the heating elements is absorbed by the fins which, on being heated, become convectors, so that the heater functions both as a radiant and as a convection heater, with its efficiency being enhanced by the reflector 14'.

The improved electric radiant convection heater of both forms of the invention is of simple and novel construction, is highly efficient in use, and is well adapted for the purposes described.

What is claimed as the invention is:

1. In combination, a hollow portable casing, a series of flat spaced convectors forming a slotted front wall of the casing, some of the convectors being outwardly angled, a pair of spaced parallel radiant heating elements within the casing rearwardly of the convectors, and a pair of spaced reflectors within the casing rearwardly of the heating elements in shielding relation thereto and arranged to reflect heat rays toward the convectors and the spaces therebetween while protecting the glowing heating elements from the direct force of air currents passing through the casing.

2. An electric heater, comprising a casing having an open front, heat absorbing, spaced metal louvers across the casing front, the laterally disposed louvers being outwardly angled, a pair of elongated, spaced apart, electric heating elements in the casing rearwardly of the louvers, and a pair of elongated, spaced, reflectors, each being of curved formation and positioned and shaped so as to shield the heating element thereadjacent from the direct force of air currents moving forwardly in the casing and into the zone influenced by the heating elements while permitting such air currents to pass through the space between the separated reflectors, radiant heat emanating from said heating elements being reflected forwardly by the reflectors with some of the radiant heat being absorbed by the louvers and with the latter functioning as convectors, some of the radiant heat passing through the spaces between the louvers being emitted directly to the atmosphere.

HARRY G. HERSH.

REFERENCES CITED

The following references are of record in the file of this patent:

UNITED STATES PATENTS

| Number | Name | Date |
|---|---|---|
| 1,406,912 | Theofilos | Feb. 14, 1922 |
| 1,552,767 | Shoenberg et al. | Sept. 8, 1925 |
| 1,699,405 | Pfau | Jan. 15, 1929 |
| 1,705,812 | Fisher | Mar. 19, 1929 |
| 1,713,013 | Wandless | May 14, 1929 |
| 1,908,559 | Roser | May 9, 1933 |
| 1,942,758 | Jessup | Jan. 9, 1934 |
| 2,036,597 | Meyrowitz | Apr. 7, 1936 |
| 2,149,689 | Smith et al. | Mar. 7, 1939 |
| 2,158,605 | Wiegand | May 16, 1939 |
| 2,167,122 | Metcalf | July 25, 1939 |
| 2,234,373 | Gough | Mar. 11, 1941 |
| 2,256,049 | Gallup | Sept. 16, 1941 |